United States Patent [19]

Hardesty

[11] Patent Number: 5,425,607

[45] Date of Patent: Jun. 20, 1995

[54] ANTI-WHIP DEVICE FOR MACHINE DRIVE SCREWS

[75] Inventor: Michael P. Hardesty, Dale, Ind.

[73] Assignee: Thermwood Corporation, Dale, Ind.

[21] Appl. No.: 274,386

[22] Filed: Jul. 13, 1994

[51] Int. Cl.6 .................. B23Q 5/40; F16H 27/02
[52] U.S. Cl. ............................ 409/238; 74/89.15; 82/163; 409/202
[58] Field of Search ............ 409/202, 212, 238, 235; 408/137, 234; 74/89.15, 424.8 R; 82/163; 51/DIG. 7

[56] References Cited

U.S. PATENT DOCUMENTS

| | | | |
|---|---|---|---|
| 3,730,051 | 5/1973 | Hatzig | 409/238 |
| 4,572,014 | 2/1986 | Kluczynski | 74/89.15 |
| 5,251,501 | 10/1993 | Katahira | 74/89.15 |

FOREIGN PATENT DOCUMENTS

| | | | |
|---|---|---|---|
| 127938 | 7/1985 | Japan | 74/89.15 |
| 66359 | 3/1990 | Japan | 409/238 |
| 150538 | 6/1990 | Japan | 74/89.15 |

Primary Examiner—William Briggs
Attorney, Agent, or Firm—Lalos & Keegan

[57] ABSTRACT

In a machine tool having a base member, a moveable member and a drive screw assembly for displacing the moveable member relative to the base member, an anti-whip device for the drive screw assembly generally consisting of a support member mounted on the base member and displaceable between a first position supporting an elongated drive screw, and in a path of travel of the moveable member and a second position not supporting the drive screw and out of the path of travel of the moveable member, yieldable means for biasing the support member into the first position and means disposed on the moveable member and engageable with the support member for camming the support member from the first position to the second position against the biasing action of the biasing means when the drive screw is driven and the moveable means is caused to traverse past the support member.

16 Claims, 3 Drawing Sheets

ANTI-WHIP DEVICE FOR MACHINE DRIVE SCREWS

BACKGROUND OF THE INVENTION

This invention relates to machine tools and more particularly to an anti-whip device for an elongated drive screw of a machine tool used to displace one component relative to another component of the machine.

In one type of conventional machine tool, there is provided a base member having a table portion on which a workpiece may be supported, a bridge or gantry member supported on the base member and adapted to be displaced relative to the base member along a longitudinal line of travel or what is commonly referred to as the x-axis, a tool head support assembly supported on the bridge member and adapted to be displaced relative to the bridge member along a transverse line of travel or what is commonly referred to as the y-axis, and a tool head assembly having one or more tools mounted thereon and engageable with a workpiece positioned on the table, supported on the tool head support assembly and adapted to be displaced along a vertical line of travel or what is commonly referred to as the z-axis.

Typically, the bridge members of such machines are displaced along the x-axis by a pair of elongated drive screws mounted on the sides of the base member which are operatively connected to the bridge member. Each of such drive screws is supported at its ends on bearings mounted in brackets secured to the base member, is driven by a motor mounted on the base member and operatively connected to an end portion of the drive screw and further is provided with a follower secured to the bridge member and operatively connected to the drive screw so that upon operation of the drive motor to rotate the drive screw, the interaction between the drive screw and the follower will cause the bridge member to be displaced along the x-axis.

Because such elongated drive screws are supported only at their end portions, the middle portions thereof tend to sag slightly, creating an out of balance condition when the drive screws is rotated, particularly at high speeds. As the drive screw is driven at higher speeds, the center thereof characteristically begins to swing in larger and larger circles until it reaches a critical speed at which point the drive screw vibrates violently, a condition which adversely affects the operation and longevity of the machine and which is sought to be avoided.

In the prior art, the most common solution for the problem of violent drive screw whipping has been to use larger diameter screws as the required lengths of the screws increase. With larger diameters, the screws sag less in the middle and can rotate faster without whip. The problem with the use of larger diameter screws, however, is that the cost of the screw and cooperating follower increases dramatically, and the mass and inertia of the screw increases requiring the use of larger and more expensive drive motors to maintain the performance of the system.

Accordingly, it is the principal object of the present invention to provide a novel means for preventing the whipping action of an elongated drive screw.

Another object of the present invention is to provide a novel means for preventing the violent whipping action of an elongated drive screw driven at high speeds.

A further object of the present invention is to provide a novel means for preventing the whipping action of an elongated drive screw without increasing the diameter of the screw.

A still further object of the present invention is to provide a novel means for preventing the whipping action of an elongated drive screw in a machine tool utilized to displace one component thereof relative to another.

Another object of the present invention is to provide a novel device for preventing the whipping action of an elongated drive screw in a machine tool utilized to displace one component thereof relative to another without increasing the mass and inertia of the crew requiring the use of larger drive motors in order to maintain the performance of the machine system.

A further object of the present invention is to provide a novel device for preventing the whipping action of an elongated drive screw in a machine tool utilized to displace one component thereof relative to another which is comparatively simple in design, relatively easy and inexpensive to manufacture and install and effective in performance.

Other objects and advantages of the present invention will become more apparent to those persons having ordinary skill in the art to which the present invention pertains from the following description taken in conjunction with the accompanying drawings wherein:

DETAILED DESCRIPTION

Figure 1:
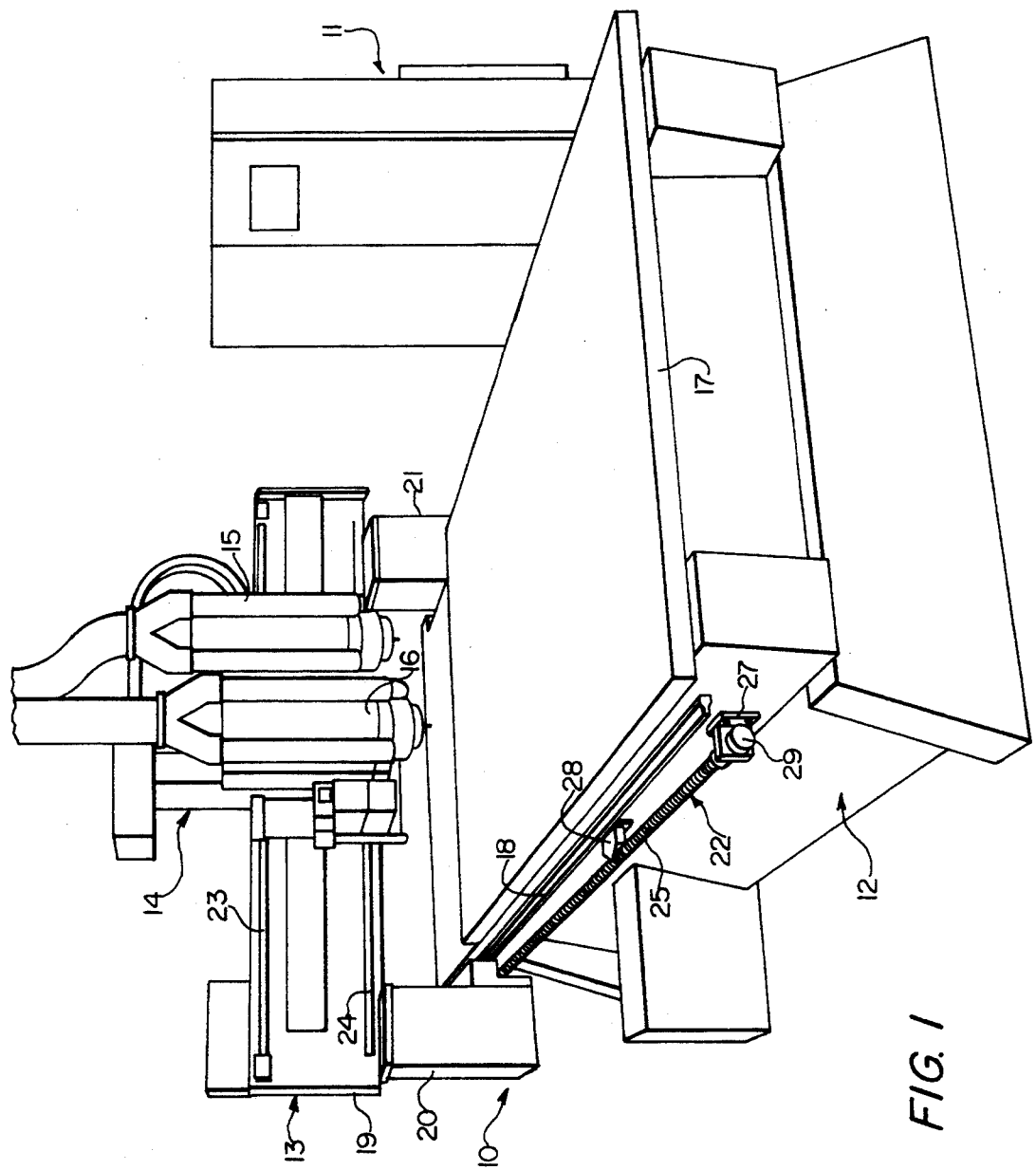
FIG. 1 is a perspective view of a computer controlled machine tool equipped with anti-whip devices for the x-axis drive screws, embodying the present invention.

Referring to FIG. 1, there is illustrated a router machine 10 and a controller 11 operatively connected to the machine for displacing a tool of the machine along a longitudinal line of travel or an x-axis, a transverse line of travel or a y-axis and along a vertical line of travel or a z-axis in accordance with a program inputted or loaded into the controller to perform a work function on one or more workpieces positioned on the machine. Generally the machine includes a base member 12, a bridge or gantry member 13, a tool head support assembly 14 and a pair of tool head assemblies 15 and 16. The base member is provided with a table portion 17 rigidly mounted on the base member and a pair of trackways 18, 18 mounted on the sides of the base member and disposed parallel to the x-axis of the machine. Table 17 is adapted to support one or more workpieces to be machined. Such workpieces are adapted to be positioned by means of positioning pins or other means and are secured in position by clamps, a vacuum holddown system or any other means.

The bridge member includes a transversely disposed beam section 19 spaced above and spanning the base member and a pair of transversely spaced, depending leg sections 20 and 21 straddling the sides of the base member and mounted on trackways 18, 18 for displacement relative to the base member along the x-axis. The bridge member is displaced relative to the base member along the x-axis by means of a pair of drive screw assemblies 22, 22 operatively interconnecting the side portions of the base member and inner side portions of leg sections 20 and 21.

Tool head support assembly 14 is supported on and guided along a pair of transversely disposed, vertically spaced trackways 23 and 24 disposed on a front face of transverse beam section 19, and is displaced along the y-axis by a drive screw assembly operatively interconnecting the bridge member and the tool head support assembly. Each of the tool head assemblies is supported and displaceable along trackways mounted on mounting support assembly 14 and is adapted to be displaced by a drive screw assembly operatively interconnecting the support assembly and the tool head assembly. Each of the tool head assemblies further is provided with a depending tool such as a router, drill, sanding wheel and the like adapted to be brought into contact with one or more workpieces mounted on table 17 to perform various work functions such as routing, drilling, sanding and the like in accordance with the program inputted or loaded into the controller.

Figure 4:
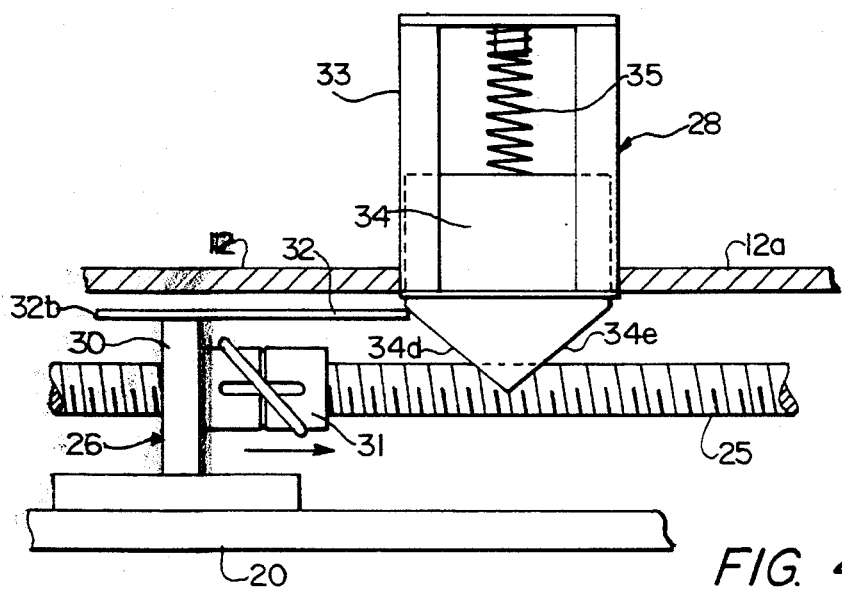
FIG. 4 is an enlarged horizontal cross-sectional view of a portion of the machine shown in FIG. 1, illustrating the anti-whip device in an operative condition supporting the drive screw with a cooperating follower assembly disposed behind the device.
Figure 5:
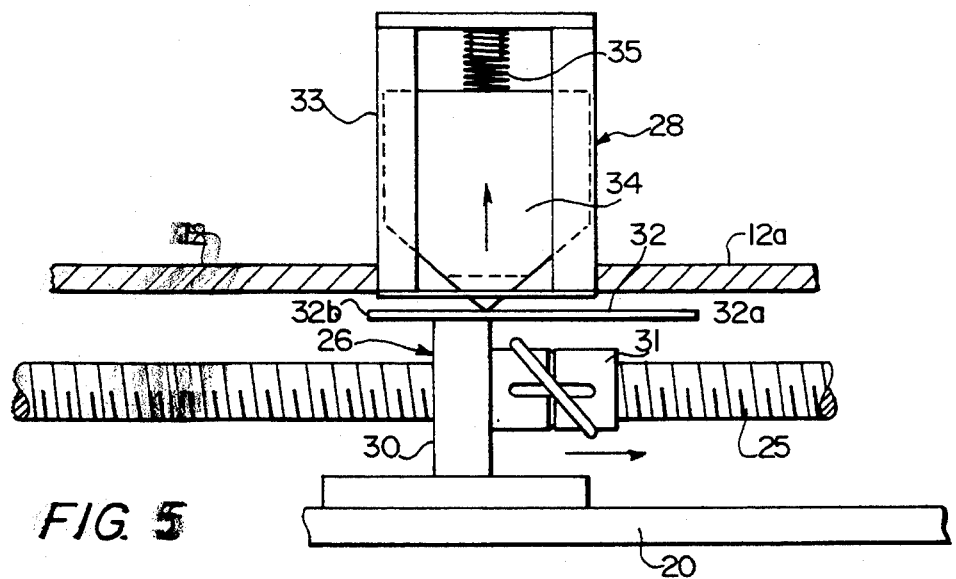
FIG. 5 is a view similar to the view shown in FIG. 4, illustrating the anti-whip device in an inoperative condition with the follower assembly disposed in opposed relation to the device.
Figure 6:
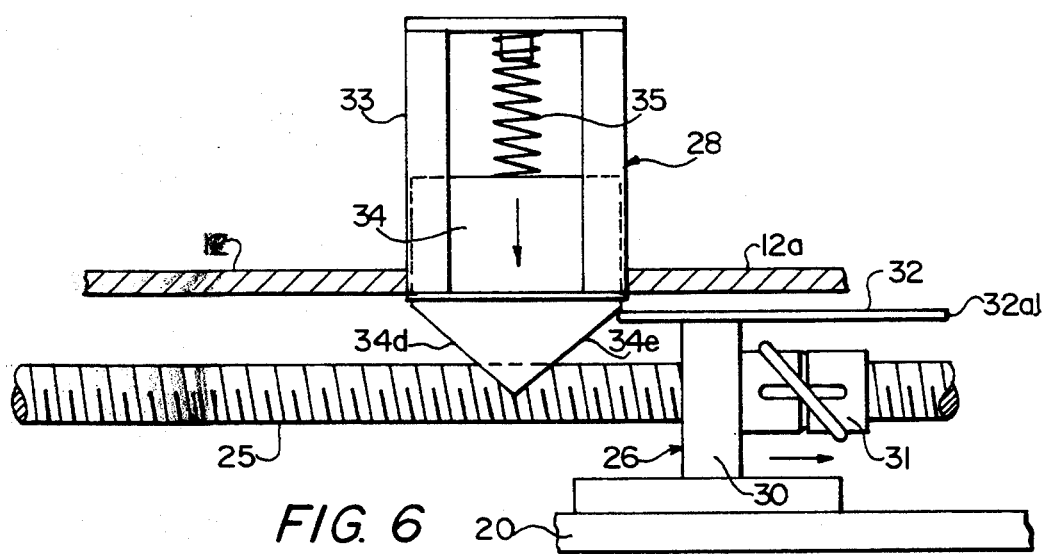
FIG. 6 is a view similar to the view shown in FIG. 4, illustrating the device in an operative position supporting the drive screw with the follower assembly disposed ahead of the device.

Each drive screw assembly 22 includes a drive screw 25 mounted on the base member and a cooperating follower 26 mounted on the inner side of a leg section of the bridge member. Drive screw 25 is supported at its ends in bearings mounted in brackets 27, 27 and further is supported at a point intermediate the ends thereof by an anti-whip device 28, and is driven by a motor 29 mounted on one of the support brackets. Follower assembly 26 includes an inwardly projecting arm member 30 mounted on a depending leg section of the bridge member and a ball nut 31 secured to arm member 26 and cooperatively mounted on drive screw 25 in the conventional manner to effect displacement of the bridge member relative to the base member along the x-axis upon operation of motors 29. As best seen in FIGS. 4 through 6, a longitudinally disposed camming plate 32 is mounted on an inner end of arm member 26, spaced between drive screw 25 and a side wall 12a of the base member. Camming plate 32 projects both forwardly and rearwardly of arm member 26 to engage and cam a portion of the anti-whip device as hereinafter described.

Figure 2:
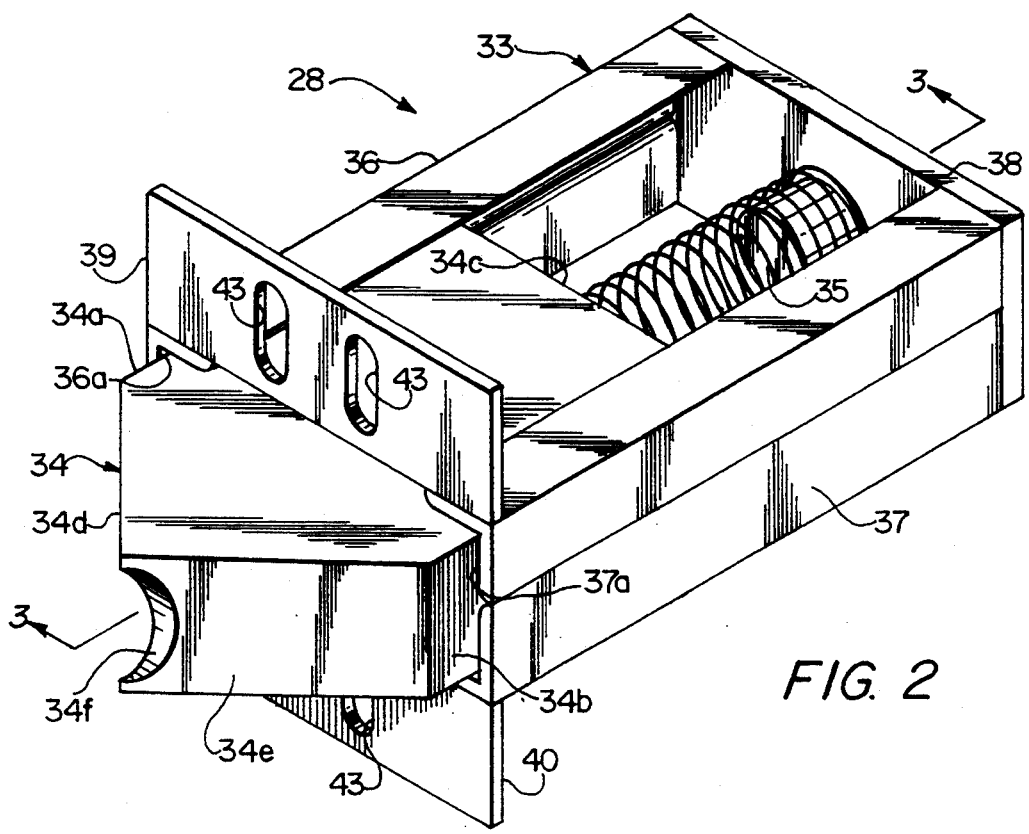
FIG. 2 is an enlarged perspective view of an anti-whip device provided in the machine shown in FIG. 1.
Figure 3:
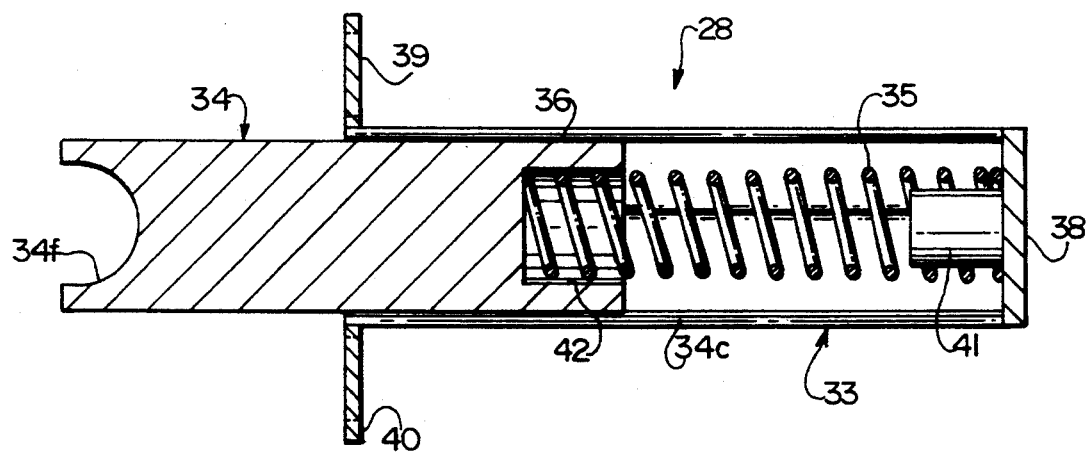
FIG. 3 is a cross-sectional view taken along line 3—3 in FIG. 2.

As best shown in FIGS. 2 and 3, anti-whip device 28 generally consists of a housing 33, a support block 34 mounted in and displaceable relative to housing 33 and a spring 35 interposed between the housing and the support block for yieldably urging the support block into an outwardly projecting position. Housing 33 includes a pair of spaced, parallel channel-shaped members 36 and 37 providing a pair of opposed guide channels 36a and 37a, a base member 38 interconnecting a rear set of ends of the channel-shaped members and a pair of upwardly and downwardly projecting mounting flanges 39 and 40 rigidly secured to front end portions of the channel-shaped members.

Support block 34 is adapted to slide freely within guide channels 36a and 37a and includes a pair of parallel side surfaces 34a and 34b, a rear surface 34c and a pair of front, camming surfaces 34d and 34e, each disposed at an angle of approximately 45° relative to the line of movement of the support block. The apex of converging surfaces 34d and 34e is provided with a recess 34f having a curved support surface provided with a curvature radius substantially similar to the drive screw radius for receiving and supporting an intermediate portion of the drive screw when the support block is in a projected or operative condition in engagement with the drive screw.

Spring 35 is mounted at its rear end on a forwardly projecting stud portion 41 of housing rear end wall 38 and has its forward end received within a recess 42 provided in rear surface 34c of the support block. The action of the spring functions to yieldingly urge the support block into an outwardly projecting or operative position as shown in FIGS. 2 and 3 for receiving and supporting an intermediate portion of drive screw 25 within recess 34f.

Anti-whip device 28 is installed in an opening provided in side wall 12a of the base member. It is mounted in a manner whereby housing 33 is received within the opening with flange portions 39 and 40 engaging the outer surface of the wall and the support block projects outwardly from the base wall to receive and support an intermediate portion of the drive screw within recess 34f of the support block. The device is rigidly secured to the base wall by means of bolts passing through openings 43 in flange members 39 and 40 and screwed into registered threaded holes in the base wall. Bolt openings 43 are elongated vertically to permit vertical adjustment of the device to properly align recess 34f of the support block to receive and support the drive screw with the support block in the extended position.

Under conditions when the bridge member is displaced along the x-axis on either side of the anti-whip device, the device will function to support the intermediate portion of the drive screw and thus prevent violent oscillations of the drive screw which otherwise would adversely affect the operation of the machine. Under conditions where the drive screws are driven to displace the bridge member along the x-axis past the point of support of the anti-whip device in a forwardly direction, a leading edge 32a of camming plate 32 will engage support block surface 34d to cam the support block inwardly against the biasing action of spring 35 to allow the movement of follower assembly 26 past the retracted support block as shown in FIGS. 4 and 5. Under such conditions, leading edge 32a of the camming plate will ride along support block surface 34d to cam the support block into the retracted position as shown in FIG. 5. Once the follower assembly passes the device and camming plate 32 clears the support block, the biasing action of the spring will cause the support block to extend and again receive the intermediate portion of the drive screw within recess 34f and again support the intermediate portion of the screw.

Under conditions where the drive screw is driven in the opposite direction to displace the bridge member rearwardly past the anti-whip device, opposite edge 32b of the camming plate will engage surface 34e of the support block to cam the support block inwardly again against the biasing action of the spring to allow the follower assembly to move past the device. Once the follower assembly passes the device so that the camming plate is clear of the support block, the biasing action of the support block will urge the support block back into engagement with the drive screw.

It will be appreciated that by use of the device as described, the device will support the drive screw under conditions when the bridge member is being displaced along the axis rearwardly or forwardly of the device, and that the support block of the device will be caused to be retracted when the bridge member is displaced along the x-axis past the device in either direction when the drive screw would be supported by the ball nut of the follower assembly and thus not subjected to severe vibration during high speed operation. It thus will be seen that violent vibrations of the drive screws are avoided without the requirement of utilizing drive screws of greater diameters, increasing the mass and inertia of the screws requiring larger drive motors, which would have the effect of dramatically increasing the cost of the machine.

The support block of the device as described can be formed of any durable, wear resisting material which is sturdy enough to support yet not abrasive to scar or otherwise damage the drive screw, such as a nylon material. The orientation of the support block and the configuration of the screw engaging portion of the block may be varied to accomplish the functions of supporting the drive screw and retracting out of the path of movement of the follower assembly as the bridge member traverses past the device. Instead of being mounted on a side wall of the base member of the machine and displacing laterally, the support block can be positioned and displaceable at an angle to the horizontal.

It further is contemplated that in machines provided with a base member, a stationary bridge member mounted on the base member and a moveable table displaceable along the x-axis, normally with the drive screws mounted on inner sides of the side walls of the base member, the devices would be mounted on the inner sides of the side walls of the base member with the follower assemblies mounted on the moveable tables. In all other respects, the anti-whip device in such machines would operate in essentially the same manner as described.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. In a machine tool having a base member, a member moveable relative to said base member and an elongated drive screw disposed on said base member and operatively connected to said moveable member for displacing said moveable member relative to said base member when said elongated drive screw is driven about its longitudinal axis, anti-whip device comprising:
    means mounted on said base member for supporting said elongated drive screw at a point intermediate the ends thereof, said supporting means being displaceable between a first position supporting said drive screw and in a path of travel of said moveable member and a second position not supporting said drive screw and out of said path of movement of said moveable member;
    yieldable means for biasing said supporting means into said first position; and
    means disposed on said moveable member and engageable with said supporting means for camming said supporting means from said first position to said second position against the biasing action of said biasing means when said drive screw is driven and said moveable means is caused to traverse past said supporting means.

2. A device according to claim 1 wherein said supporting means is displaceable along a line of travel disposed at an angle relative to said drive screw axis.

3. A device according to claim 2 wherein said angle is 90°.

4. A device according to claim 1 wherein said supporting means is formed of a wear resistant material.

5. A device according to claim 4 wherein said material is nylon.

6. A device according to claim 1 wherein said supporting means includes a surface engaging an underside portion of said drive screw in supporting relation therewith when said supporting means is in said first position.

7. A device according to claim 1 wherein said supporting means includes at least one cam surface disposed at an angle relative to said drive screw axis, and said camming means comprises a follower member engageable with said cam surface for camming said supporting means from said first position to said second position.

8. A device according to claim 1 wherein said supporting means includes a pair of outwardly facing, converging cam surfaces disposed at angles relative to said drive screw axis, and said camming means comprises a pair of follower members each engageable with one of said cam surfaces for displacing said supporting means from said first position to said second position.

9. A device according to claim 1 wherein said biasing means comprises a spring.

10. A device according to claim 1 wherein said biasing means comprises a tension spring interposed between said base member and said supporting means.

11. A device according to claim 1 wherein said supporting means is displaceable between said first and second positions along a horizontal line of travel disposed perpendicular to said drive screw axis.

12. A device according to claim 11 wherein said supporting means includes an arcuate surface engaging an underside portion of said drive screw in supporting relation therewith when said supporting means is in said first position.

13. A device according to claim 11 wherein said supporting means includes at least one vertically disposed cam surface disposed at an angle relative to said drive screw axis, and said camming means comprises a follower member engageable with said cam surface for displacing said supporting means from said first position to said second position.

14. A device according to claim 13 wherein said follower member projects longitudinally ahead of said moveable member to engage said cam surface ahead of said moveable member.

15. A device according to claim 13 wherein said supporting means includes a pair of vertically disposed, converging cam surfaces disposed at angles relative to said drive screw axis, and said camming means comprises oppositely projecting follower members each engageable with one of said cam surfaces for displacing said supporting means from said first to said second position as said moveable means is displaced past said supporting means.

16. A device according to claim 15 wherein said follower members project longitudinally from opposite sides of said moveable member to engage said cam surfaces ahead of said moveable member.

* * * * *